No. 719,616. PATENTED FEB. 3, 1903.
J. P. SCOVILL.
PROCESS OF PEELING TOMATOES, &c.
APPLICATION FILED SEPT. 6, 1901.
NO MODEL.
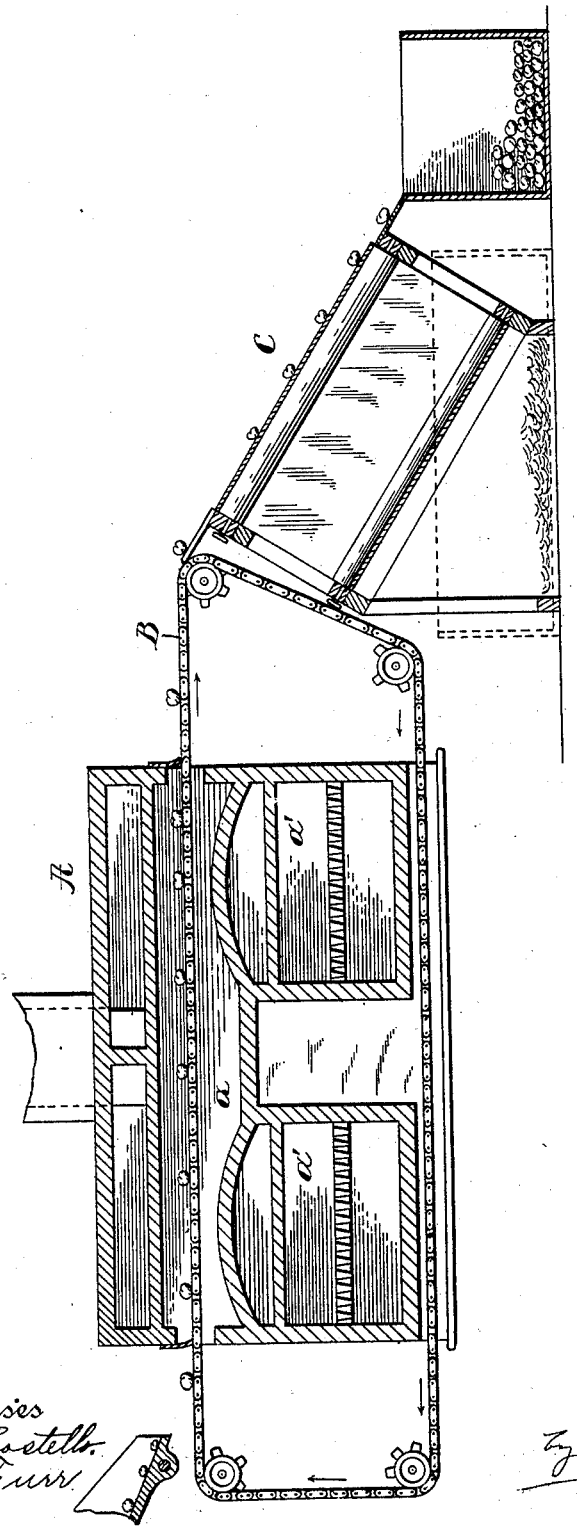
Witnesses
K. A. Costello.
M. P. Furr.
Inventor
Jas. P. Scovill,
Attorney

UNITED STATES PATENT OFFICE.

JAMES P. SCOVILL, OF CHICAGO, ILLINOIS.

PROCESS OF PEELING TOMATOES, &c.

SPECIFICATION forming part of Letters Patent No. 719,616, dated February 3, 1903.

Application filed September 6, 1901. Serial No. 74,566. (No specimens.)

*To all whom it may concern:*

Be it known that I, JAMES P. SCOVILL, a citizen of the United States, residing at Chicago, in the county of Cook and State of Illinois, have invented a certain new and Improved Process of Peeling Tomatoes, &c., of which the following is a specification.

In the accompanying drawing is represented a diagrammatic view of one form of apparatus for carrying out my improved process.

In peeling tomatoes for canning it has long been the practice of housekeepers and canning-factories to scald the fruit in order to loosen its skin, and thus enable the peeling operation to be accomplished more easily and rapidly. This practice, however, is fully effective only with ripe fruit, since the skin of green tomatoes or of green spots or parts of otherwise ripe tomatoes is not loosened by scalding, but requires the use of a knife for the purpose, and inasmuch as almost all tomatoes picked for canning are green in spots, particularly around the stem, they practically all require the cutting away of a greater or less portion of their surface and substance, and owing to this fact and to the carelessness of the peelers a very large waste results, amounting frequently to almost one-half of the fruit supplied to them. In addition to this the practice is detrimental to the product, since the scalding operation, which usually requires two minutes or more, causes a boiling out of the juices and a loss of flavor, and also so softens the fruit as to render its subsequent handling difficult and the use of machinery for removing the skin practically impossible. I have, however, discovered that if instead of scalding the fruit it be blistered by being subjected for a very short time to a dry heat of an exceedingly high temperature the skin will be effectually loosened throughout whether the tomatoes are green or ripe, and can thereafter be readily rubbed or scraped off either by hand or by properly-designed machinery, such as is set forth, for example, in my companion application for improvements in machines for peeling tomatoes, &c., executed concurrently herewith, Serial No. 74,568, or in the annexed drawing, in which—

A designates an oven having a hot-air or blistering chamber $a$ and a combustion-chamber $a'$, B an endless carrier for conveying the fruit through the blistering-chamber at the proper speed, and C a peeling-machine of suitable construction adapted to receive the fruit from the carrier and to strip off its blistered skins.

The degree of heat to which the fruit is subjected should be as high as it is practicable to obtain in an oven suitable for the purpose, and the period of time during which the fruit remains subjected to the heat should be no longer than is necessary to completely blister the skin. I have found that with a temperature of from 500° to 1,000° the necessary blistering effect can be produced in from twenty to thirty seconds, and under these conditions the body of the tomato beneath the skin is practically not heated at all, but remains cool and unchanged from its original hard condition. With still higher temperatures the length of time during which the fruit is exposed to the heat may be still further reduced with advantage. Tomatoes blistered in this manner can thereafter be peeled with the greatest ease and rapidity throughout the entire area of the fruit, including all green spots and close up around the stem as well, and this peeling operation may be carried on by hand or by suitable machinery—such, for example, as that set forth in my concurrent application hereinbefore referred to. The quality of the fruit is not in any way harmed by the process, since, as above stated, its body remains hard and cool and unchanged in condition throughout, so that it suffers no loss of juice or flavor and may thereafter be handled as readily as if in its original condition.

I claim as my invention—

The improved process of peeling tomatoes and the like, which consists in first blistering the skin by subjecting the fruit to a dry heat of high temperature for a brief period of time insufficient to cook or materially affect the body of the fruit, and then rubbing or stripping the blistered skin from the body of the fruit, substantially as described.

In testimony that I claim the foregoing as my invention I affix my signature, in presence of two subscribing witnesses, this 12th day of August, A. D. 1901.

J. P. SCOVILL.

Witnesses:
HATTIE E. RANDELL,
JAMES D. JARVIS.